(12) United States Patent
Jokschas et al.

(10) Patent No.: US 8,857,628 B2
(45) Date of Patent: Oct. 14, 2014

(54) FILTER FOR SEPARATING TWO LIQUIDS OR LIQUID CONSTITUENTS FROM A GAS

(75) Inventors: Guenter Jokschas, Murrhardt (DE); Ludwig Bammersperger, Reisbach (DE)

(73) Assignee: Mann+Hummel GmbH, Ludwigsburg (DE)

( * ) Notice: Subject to any disclaimer, the term of this patent is extended or adjusted under 35 U.S.C. 154(b) by 733 days.

(21) Appl. No.: 11/785,047

(22) Filed: Apr. 13, 2007

(65) Prior Publication Data

US 2007/0221566 A1    Sep. 27, 2007

Related U.S. Application Data

(63) Continuation of application No. PCT/EP2005/055253, filed on Oct. 14, 2005.

(30) Foreign Application Priority Data

Oct. 14, 2004   (DE) .......................... 10 2004 050 264

(51) Int. Cl.
*B01D 35/28* (2006.01)
*F02M 37/22* (2006.01)

(52) U.S. Cl.
CPC .......... *B10D 36/003* (2013.01); *F02M 37/221* (2013.01)
USPC ......................... 210/455; 210/435; 210/493.1

(58) Field of Classification Search
CPC ................. B10D 36/003; B10D 2201/0423; B10D 2201/0415; B10D 2201/04; B10D 2201/295; B10D 2201/4046; B10D 2201/4023; B10D 29/23; B10D 29/96; F02M 37/221

USPC ........................ 210/455, 435, 493.1
See application file for complete search history.

(56) References Cited

U.S. PATENT DOCUMENTS

| | | | |
|---|---|---|---|
| 4,619,764 A | | 10/1986 | Church et al. |
| 4,626,348 A | * | 12/1986 | Stone ............................ 210/248 |
| 5,182,015 A | * | 1/1993 | Lee ................................. 210/94 |
| 5,304,312 A | * | 4/1994 | Forster et al. ................. 210/808 |
| 5,486,290 A | * | 1/1996 | McGinness et al. ........ 210/323.2 |
| 5,624,559 A | * | 4/1997 | Levin et al. ................... 210/447 |
| 5,904,844 A | | 5/1999 | Stone |
| 6,068,763 A | * | 5/2000 | Goddard ....................... 210/130 |

(Continued)

FOREIGN PATENT DOCUMENTS

| | | |
|---|---|---|
| DE | 299 15 146 U1 | 1/2000 |
| DE | 100 29 539 A1 | 12/2001 |

(Continued)

OTHER PUBLICATIONS

International Search Report dated Dec. 20, 2005 with English translation (Six (6) Pages.

*Primary Examiner* — Bobby Ramdhanie
*Assistant Examiner* — Denise R Anderson
(74) *Attorney, Agent, or Firm* — James Hasselbeck

(57) ABSTRACT

A filter including a housing for receiving a filter medium and a filter medium received therein. In a lower region of the filter there is a discharge opening for discharging liquid from the filter. A spacer serves to form a collecting chamber for liquid and defines the liquid collecting chamber. The spacer is provided with webs which lead to an eye, and the eye has liquid channels.

9 Claims, 1 Drawing Sheet

(56) References Cited

U.S. PATENT DOCUMENTS 6,270,660 B1 * 8/2001 Roll et al. .................... 210/131
2002/0038780 A1    4/2002 Jokschas et al.
2004/0195171 A1 * 10/2004 Frye ............................ 210/455

FOREIGN PATENT DOCUMENTS

| EP | 0 433 664 B1 |   | 6/1991 |
|----|--------------|---|--------|
| EP | 04333664     | * | 6/1991 |
| EP | 0 732 133 A1 |   | 9/1998 |

* cited by examiner

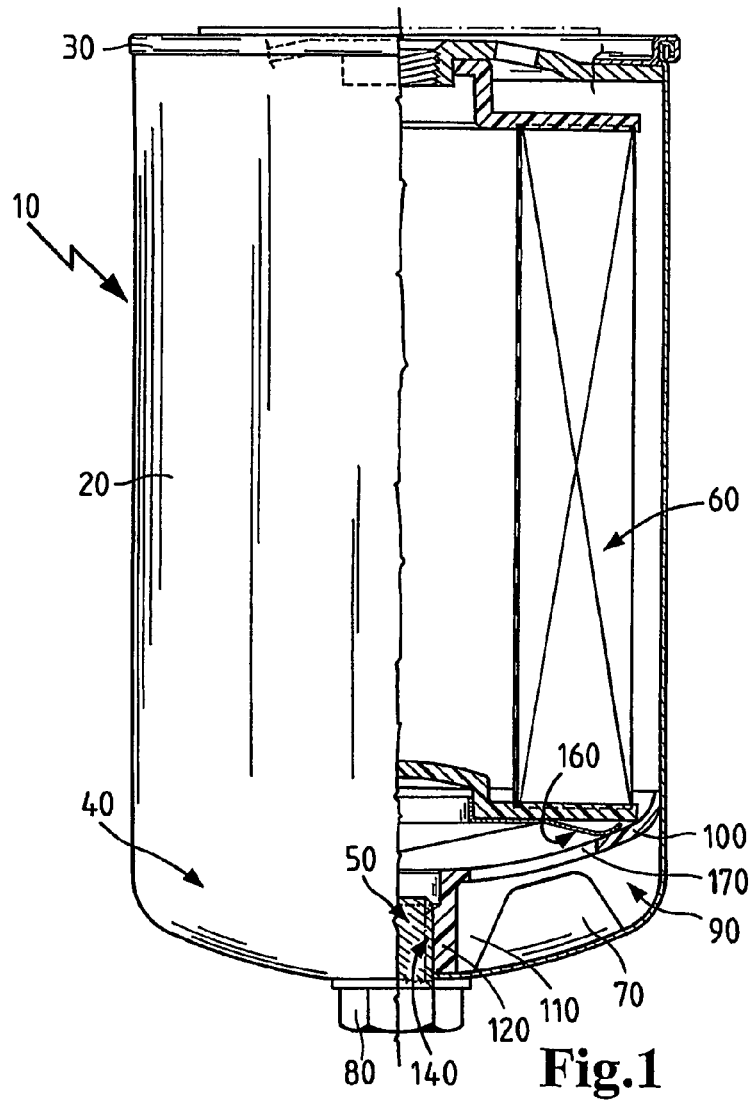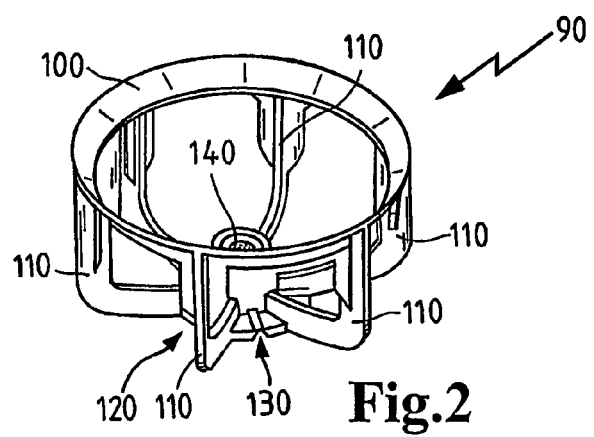

FILTER FOR SEPARATING TWO LIQUIDS OR LIQUID CONSTITUENTS FROM A GAS

CROSS REFERENCE TO RELATED APPLICATIONS

This application is a continuation of international patent application no. PCT/EP2005/055253, filed Oct. 14, 2005 designating the United States of America and published in German on Apr. 20, 2006 as WO 2006/040348, the entire disclosure of which is incorporated herein by reference. Priority is claimed based on Federal Republic of Germany patent application no. DE 10 2004 050 264.1, filed Oct. 14, 2004.

BACKGROUND OF THE INVENTION

The invention relates to a filter, particularly a liquid filter, e.g., for filtering fuels, such as gasoline or diesel, for internal combustion engines.

Modern internal combustion engines make ever-increasing demands on the fluids used, such as oil, or the fuels gasoline and diesel. Modern injection systems of Otto and diesel engines are sensitive to even the smallest impurities in the fuel. Damage to the injection systems can occur as a result of particle erosion and corrosion due to water contained in the fuel. One function of the fuel filters, in addition to particle filtration, can also be the removal of water from the fuel.

Corrosion due to water content is particularly problematic in diesel engines. Water content in diesel fuel can range from 200 ppm to 2 percent. Water can be present in the fuel in free or stably emulsified form. In modern diesel engines, fuel is normally injected directly into the cylinders. A distinction is drawn primarily between pump nozzle systems, common rail systems and direct injection with solenoid valve-controlled distributor injection pumps, the latter being increasingly rare. Common rail systems and distributor injection pumps are particularly sensitive to high water contents in the fuel because the fuel remains longer in the injection system. Pump nozzle systems require water separation only if a large amount of water is expected.

Water droplets normally separate in the fuel filter along the fibers of the filter medium and aggregate to increasingly larger droplets. The droplets flow down along the outside and partly along the inside of the filter pleats because of their higher density compared to that of the fuel. The water collects in a liquid collection space, a water collection space, that is normally disposed below the filter medium. From this water collection space, the water can then be removed, for example using a valve, without the entire filter having to be changed.

There are various embodiments of the filter and the configuration of a liquid collection space below a filter element within a filter.

U.S. Pat. No. 5,904,844 describes a fuel filter with a two-part housing. The first part of the housing holds the filter medium. The filter medium is at least partly supported in the lower region of the first part of the housing. A second part forming the water collection space is screwed onto to the lower end of the first part of the housing. A disadvantage of the construction of the filter of the '844 patent is that the filter body cannot be manufactured in one piece. Threads or connecting devices and seals are required between the first part of the housing with the filter medium and the second part of the housing with the water collection space.

German patent application no. DE 100 29 539, for example, discloses a filter with an annular filter medium. The filter medium is disposed in the upper region of the housing and a spacer for the filter element is provided in the lower region. The spacer has a spring element. The spacer ensures that a collection space can be formed for the separated water. The housing in which the filter medium and the spacer are located can be formed of a single piece and closed by a lid.

SUMMARY OF THE INVENTION

An object of the invention is to provide a further-developed filter.

Another object of the invention is to provide a filter that can be produced at low cost.

Yet another object of the invention is to provide a filter having a simple mount for a liquid outlet.

These and other objects are attained by a filter according to the invention.

In accordance with the present invention, the filter comprises a housing for receiving a filter medium and a filter medium. In the lower region of the filter, an outlet opening is disposed for removing liquids from the filter. A spacer serves to form a collection space for liquids and defines the liquid collection space. The spacer has webs leading to an eye, and the eye has liquid channels. Liquids can reach the region below the eye through these liquid channels, even if the eye contacts the floor of the housing. This allows liquids to be discharged below the eye. The described spacer makes it possible to use a one-part housing, which is inexpensive to manufacture.

In one advantageous embodiment, the spacer is configured as a support ring. The spacer can be introduced into the filter housing with an accurate fit, so that the spacer is unlikely to slip.

In another embodiment, the spacer includes a mount for a liquid outlet. Advantageously, the liquid outlet can be screwed into the eye of the spacer as a drain plug or a drain valve. The use of the spacer as a mount for a device for discharging the liquid simplifies the manufacture of the filter.

These and other features of preferred embodiments of the invention, in addition to being set forth in the claims, are also disclosed in the specification and/or the drawings, and the individual features each may be implemented in embodiments of the invention either alone or in the form of subcombinations of two or more features and can be applied to other fields of use and may constitute advantageous, separately protectable constructions for which protection is also claimed.

BRIEF DESCRIPTION OF THE DRAWINGS

The invention will be described in further detail hereinafter with reference to illustrative preferred embodiments shown in the accompanying drawing figures, in which:

FIG. 1 is a sectional view of a filter with a spacer according to the invention, and FIG. 2 is a view of the spacer shown in FIG. 1.

DETAILED DESCRIPTION OF PREFERRED EMBODIMENTS

FIG. 1 shows one possible embodiment of the filter 10 according to the invention. The filter 10 depicted can be used to filter diesel fuel, for example, and makes it possible to separate water from the diesel fuel. The filter 10 is designed to screw onto a support. The support has both an inlet and an outlet for the fuel. The housing 20 of the filter is formed as a single piece and provided with a lid 30. The housing 20 is pot-shaped. In the lower region 40 of the filter 10 is an opening 50.

Within the filter 10 is located a filter medium 60, particularly a pleated star-shaped nonwoven filter material or filter paper. In the lower region of the pot-shaped housing 20 is a collection space 70 for the water being separated. The collection space 70 is closed with a drain plug 80. Within the collection space 70 there is a spacer 90 in the form of a crown-shaped synthetic resin (i.e., plastic) part, which has a support rim 100 for the filter medium 60 and webs 110, which have a certain axial height to define the collection space 70 for the water.

The webs 110 are jointly connected to an eye 120 in the center. The eye 120 has drainage channels 130 and a thread 140 for the drain plug 80. The drainage channels 130 can be configured as bores in the area of the eye 10. Advantageously, the drainage channels 130 are configured as groove-like indentations in the material of the spacer 90. The drainage plug 80 is screwed into the spacer 90 through a bore in the housing 20 of the filter 10. The plug 80 can be opened to discharge the water separated from the diesel fuel.

The filter 10 shown in FIG. 1 can be used correspondingly as a gas filter, particularly as an air filter for separating liquid components. An air filter of this type could be used in a crank case ventilation system, for example.

FIG. 2 is a detail view of the spacer 90 used in the filter 10 depicted in FIG. 1. Webs 110 starting from a support ring 100 on which the filter medium 60 can rest converge in the eye 120. As shown in FIG. 2, the eye 120 may be a plate-like member having a bottom face lying upon a lower wall of the housing. The eye 120 has an internal thread 140 that can be used to fasten a water outlet. Formed on the bottom face of the eye 120, groove-shaped indentations may be seen, which can serve as discharge channels 130 for water. The grooves or discharge channels 130 rest against and are radially closed over by the lower wall of the housing 20. The spacer 90 is preferably formed of synthetic resin material. The shape of the spacer 90 makes it easy to insert it into the housing 20 of the filter 10. The shape of the spacer 90 largely prevents it from slipping within the housing 20. As shown in FIG. 2, the support webs 110 may be "L" shaped and have an end secured to the eye 120 and an opposing end secured to the support ring 100.

The foregoing description and examples have been set forth merely to illustrate the invention and are not intended to be limiting. Since modifications of the described embodiments incorporating the spirit and substance of the invention may occur to persons skilled in the art, the invention should be construed broadly to include all variations within the scope of the appended claims and equivalents thereof.

What is claimed is:

1. A filter for filtering a liquid, said filter comprising:
   i) a housing including a spacer received into and enclosed in a lower portion of said housing, a lower wall of said housing and said spacer forming a collection space therebetween for liquids, said spacer including a threaded central eye, said eye comprising liquid channels formed as grooves in a material of the spacer and extending radially from the eye to permit flow of the separated liquid to the eye from a lower portion of said collection space, wherein said spacer includes a tapered support ring with an outer circumferential portion tapering upwards to rest against a wall of said housing;
   ii) a filter medium received in the housing and resting non-attached on said tapered support ring, said tapered support ring radially centering said filter medium in said housing;
   iii) an outlet opening formed in a lower region of the filter housing for discharging a separated liquid from the filter;
   wherein said spacer includes support webs extending radially from said eye, said webs supporting said support ring upon said lower wall of said housing to define said collection space;
   wherein the spacer comprises a threaded mount for a separated liquid outlet component that can be screwed into the spacer through the housing;
   wherein said eye of said spacer is a plate-like member having said threaded mount in a central portion, said plate-like member having a bottom face positioned parallel to and lying upon said lower wall of said housing;
   wherein said liquid channels are formed by radially extending grooves formed into an exterior wall of the plate-like member on its bottom face, the radially extending grooves closed over by the lower wall of said housing forming circumferentially closed liquid channels arranged external to and underneath the spacer plate-like member and closed over by the bottom housing wall;
   wherein the walls that circumferentially enclose the liquid channels consisting of:
      the bottom face of the plate-like member; and
      the bottom wall of the housing;
   wherein the liquid channels have two opposing openings;
      a radially outer opening at a radial outer circumference of the plate-like eye member, the radially outer opening arranged exterior to and underneath the plate-like eye member and at the lower wall of the housing, the radially outer opening arranged to drain liquid from the collection space; and
      an opposing radially inner opening at the thread mount in a central portion of the plate-like eye member, the radially inner opening arranged exterior to and underneath the plate-like eye member and at the lower wall of the housing;
   wherein the closed grooves are circumferentially closed from the radially outer opening to the radially inner opening by the bottom face of the plate-like member and the bottom wall of the housing, the grooves arranged externally on the bottom face underneath the plate-like member, providing liquid discharge underneath the plate-like eye member to the outlet opening.

2. A filter as claimed in claim 1, wherein said filter is connected to a fuel line of a diesel engine and said liquid is diesel fuel.

3. A filter as claimed in claim 1, wherein the housing is formed in one piece.

4. A filter as claimed in claim 1, wherein the filter medium comprises a star-shaped pleated filter medium.

5. A filter as claimed in claim 1, wherein the filter medium comprises a nonwoven filter material or filter paper.

6. A filter as claimed in claim 1, wherein the spacer is formed of synthetic resin material.

7. A filter as claimed in claim 1, wherein the spacer is crown-shaped.

8. A filter as claimed in claim 1, wherein the liquid outlet comprises a drain plug.

9. A filter as claimed in claim 1, wherein
   said support webs are "L" shaped support webs having a first leg extending radially outwardly from said plate-like member and a second leg extending axially upwardly to said tapered support ring, said "L" shaped support webs having a first end secured to said plate-like member and an opposing second end secured to said tapered support ring.

* * * * *